(12) United States Patent
Morris et al.

(10) Patent No.: US 7,478,833 B2
(45) Date of Patent: Jan. 20, 2009

(54) VOLUME-FILLING MECHANICAL STRUCTURES FOR A BOLSTER SYSTEM

(75) Inventors: Steven E. Morris, Fair Haven, MI (US); Lawrence C Maugh, Ann Arbor, MI (US); Robert R. Kubiak, Macomb, MI (US); Peter J. Gareau, Warren, MI (US); Brian Latouf, Rochester, MI (US)

(73) Assignee: General Motors Corporation, Detroit, MI (US)

( * ) Notice: Subject to any disclaimer, the term of this patent is extended or adjusted under 35 U.S.C. 154(b) by 459 days.

(21) Appl. No.: 11/085,359

(22) Filed: Mar. 21, 2005

(65) Prior Publication Data
US 2006/0208473 A1   Sep. 21, 2006

(51) Int. Cl.
*B60R 21/04* (2006.01)
(52) U.S. Cl. .................................. 280/751
(58) Field of Classification Search ............ 280/751, 280/752, 753, 732, 743.2; 296/187.02
See application file for complete search history.

(56) References Cited

U.S. PATENT DOCUMENTS

| 6,318,755 | B1 * | 11/2001 | Nusser et al. | 280/752 |
| 6,340,170 | B1 * | 1/2002 | Davis et al. | 280/730.1 |
| 7,040,658 | B2 * | 5/2006 | Kellas | 280/751 |
| 2004/0056463 | A1 * | 3/2004 | Marks et al. | 280/752 |

* cited by examiner

*Primary Examiner*—Faye M. Fleming

(57) ABSTRACT

A volume-filling mechanical structure for modifying a crash includes a bolster system defined by an outer bolster and an inner bolster, a honeycomb celled material expandable from a dormant state to a deployed state, the honeycomb celled material disposed intermediate the outer and inner bolsters cooperatively positioned with the honeycomb celled material to cover surfaces defining the honeycomb celled material in the deployed and dormant states, and a means for deploying the honeycomb celled material from the dormant state to the deployed state causing the outer bolster to translate away from the inner bolster.

13 Claims, 7 Drawing Sheets

VOLUME-FILLING MECHANICAL STRUCTURES FOR A BOLSTER SYSTEM

TECHNICAL FIELD

The present invention relates to structures used for crash protection and/or crash energy management at around the time of a vehicle crash, and more particularly to mechanical structures which are volumetrically reconfigurable such as to occupy a small volume when in a dormant state and then rapidly expand to a larger volume in a deployed state when needed for providing crash protection and/or crash energy management.

BACKGROUND OF THE INVENTION

A vehicle, in addition to the inherent crush characteristics of its structure, may have dedicated crash energy management structures. Their function is exclusively to dissipate energy in the event of a crash. Such dedicated structures have predetermined crush characteristics which contribute to the resulting deceleration pulse to which the occupants are subjected.

In the vehicular arts there are two known types of such dedicated crash energy management structures: those which are passive, and those which are active.

An example of a passive dedicated crash energy management structure is an expanded honeycomb celled material, which has been used to a limited degree in certain vehicles. FIG. 1 exemplifies the process of fabrication of a honeycomb-celled material. A roll 10 of sheet material having a preselected width W is cut to provide a number of substrate sheets 12, each sheet having a number of closely spaced adhesive strips 14. The sheets 12 are stacked and the adhesive cured to thereby form a block, referred to as a HOBE® (registered trademark of Hexcel Corporation) block 16 having a thickness T. The HOBE block is then cut into appropriate lengths L to thereby provide HOBE bricks 18. The HOBE brick is then expanded by the upper and lower faces 20, 22 thereof being separated away from each other, where during the adhesive strips serve as nodes whereat touching sheets are attached to each other. A fully expanded HOBE brick is composed of a honeycomb celled material 24 having clearly apparent hexagonal cells 26. The ratio of the original thickness T to the expanded thickness T' is between 1 to 20 to 1 to 60. An expanded honeycomb celled material provides crash energy management parallel to the cellular axis at the expense of vehicular space that is permanently occupied by this dedicated energy management structure.

Typically, crash energy management structures have a static configuration in which their starting volume is their fixed, operative volume, i.e. they dissipate energy and modify the timing characteristics of the deceleration pulse by being compressed (i.e., crushing or stroking of a piston in a cylinder) from a larger to a smaller volume. Since these passive crash energy management structures occupy a maximum volume in the uncrushed/unstroked, initial state, they inherently occupy vehicular space that must be dedicated for crash energy management—the contraction space being otherwise unstable. Expressed another way, passive crash energy management structures use valuable vehicular space equal to their initial volume which is dedicated exclusively to crash energy management throughout the life of the vehicle even though a crash may never occur, or may occur but once during that time span. This occupied contraction space is not available for other uses, including functions such as enabling a more spacious vehicle interior and styling flexibility.

The fixed fore-aft location of a knee bolster may constrain how far the lower portion of the instrument panel can be placed forward and away from the knees of an occupant. This constraint can limit comfort for the occupant. The position of current fixed-in place knee bolster systems is also a constraint on interior spaciousness. It is known that utilization of inflatable knee bolster systems brings the location of the lower portion of the instrument panel rearward when preferred. However, such crash triggered inflatable knee bolster systems do not typically retract automatically, and could require complete replacement after actuation. Such replacement is expensive, a cost borne by the consumer.

Active crash energy management structures have a predetermined size which expands at the time of a crash so as to increase their contribution to crash energy management.

One type of dedicated active crash energy management structure is a stroking device, basically in the form of a piston and cylinder arrangement. Stroking devices have low forces in extension and significantly higher forces in compression (such as an extendable/retractable bumper system) which is, for example, installed at either the fore or aft end of the vehicle and oriented in the anticipated direction of crash induced crush. The rods of such devices would be extended to span the previously empty spaces upon the detection of an imminent crash or an occurring crash (if located ahead of the crush front). This extension could be triggered alternatively by signals from a pre-crash warning system or from crash sensors or be a mechanical response to the crash itself. An example would be a forward extension of the rod due to its inertia under a high G crash pulse. Downsides of such an approach include high mass and limited expansion ratio (1 to 2 rather than the 1 to 20 to 1 to 60 possible with a compressed honeycomb celled material).

Another type of active dedicated crash energy management structure is inflatable airbags or pyrotechnic air cans. Downsides of such systems, in addition to those discussed above, include low force levels and low ratios of crush force to added mass due to the lack of mechanical rigidity of these systems.

Accordingly, what remains needed in the vehicular arts is a dedicated vehicular crash energy management structure which provides at times other than a crash event open spaces for other uses than crash pulse management, a high level of compression ratio, high crush force, and a low crush force to mass ratio.

SUMMARY OF THE INVENTION

In one embodiment herein there is provided a volume-filling mechanical structure for modifying a crash includes a bolster system defined by an outer bolster and an inner bolster, a honeycomb celled material expandable from a dormant state to a deployed state, the honeycomb celled material disposed intermediate the outer and inner bolsters cooperatively positioned with the honeycomb celled material to cover surfaces defining the honeycomb celled material in the deployed and dormant states, and a means for deploying the honeycomb celled material from the dormant state to the deployed state causing the outer bolster to translate away from the inner bolster.

In another embodiment herein there is also provided a method for attenuating a vehicle crash energy impact. The method includes attaching a volume-filling mechanical structure to a bolster system defined by an outer bolster and an inner bolster of a vehicle, wherein the volume-filling mechanical structure comprises a honeycomb celled material expandable from a dormant state to a deployed state. The honeycomb celled material is disposed intermediate the outer and inner bolsters cooperatively positioned with the honeycomb celled material to cover surfaces defining the honeycomb celled material in the deployed and dormant states. The volume-filling mechanical structure further includes a means for deploying the volume-filling mechanical structure from the dormant state to the deployed state. The honeycomb celled material is expanded with the means for deploying at about an energy impact to the vehicle causing the outer bolster to translate away from the inner bolster, wherein the honeycomb celled material absorbs kinetic energy from the energy impact.

In yet another embodiment herein there is provided a motor vehicle equipped with a crash energy management structure, comprising a bolster system; and a crash energy management structure connected to the bolster system. The crash energy management structure includes a volume-filling mechanical structure connected to the bolster system. The said volume-filling mechanical structure is expandable from a first volume to a second volume, wherein the second volume is larger than the first volume. An exposed bolster surface is cooperatively positioned with the mechanical structure to selectively cover a surface of the first and second volumes, wherein the exposed bolster surface has a dormant state for the first volume and a deployed state for the second volume. The crash energy management structure includes a means for deploying expansion of the mechanical structure from the first volume to the second volume, and for regulating a transition from the dormant state to the deployed state of the exposed bolster surface.

The embodiments noted above provide for a mechanical, active dedicated crash energy management structure for providing crash protection and/or crash energy management, wherein the structure has a dormant (initial) state volume, but then in the event of a crash, utilizes various means of deployment that timely expand into a much larger deployed volume for providing management of energy of an expectant crash.

The active dedicated crash energy management structure according to the present invention directly addresses the space robbing deficiency of prior art crash energy management structures. It does this specifically by having a small dormant volume (during normal driving conditions) which allows empty space adjacent thereto for enabling a more spacious vehicle interior and styling flexibility, and only assumes a larger deployed volume just prior to, or in response to, a crash.

The principle embodiment of the crash energy management structure according to the present invention is a before expansion honeycomb celled material brick (honeycomb brick) such as for example manufactured by Hexcel Corp. of Pleasanton, Calif., wherein expansion of the honeycomb brick is in a plane transverse to the cellular axis of the cells thereof, and crash crush is intended to be parallel to the cellular axis.

The honeycomb brick occupies anywhere from approximately ½0th to ⅙0th of the volume that it assumes when in it is fully deployed (the expansion ratio) into a deployed honeycomb celled material (deployed honeycomb), depending on the original cell dimensions and wall thickness. Honeycomb cell geometries with smaller values of the expansion ratio in general deliver larger crush forces, and the choice of the honeycomb celled material is dependent upon the crush force (stiffness) desired in a particular crash energy management application (i.e., softer or harder metals or composites). Deployed honeycomb celled material has excellent crash energy management capabilities, but only parallel to the cellular axis, as discussed hereinabove.

According to one embodiment herein, various devices provide for means of deploying a volume-filling mechanical structure, such as an expandable honeycomb brick located within a panel, such as exist for example in the instrument panel including the glove box panel or steering column filler. The honeycomb brick is placed so that the common cellular axis of its cells is oriented parallel to an envisioned crash axis, i.e., the direction of impact for which it is intended to serve as an energy absorber. A rigid end cap is attached, respectively, to each of the mutually opposed upper and lower end faces of the honeycomb brick (the ends which are perpendicular to the transverse plane and parallel to the crash axis).

In the event of a crash, either an active or passive deployment means is provided for moving the end caps away from each other so that the honeycomb brick expands in the transverse plane into the previously unoccupied transversely adjacent space. For example, movement of the end caps may be triggered by a pyrotechnic explosion, air pressure, a pneumatic spring, a tensioning of a flexible cable, a solenoid, an active material and the like. Upon expansion, this previously unoccupied space will now function efficiently for crash energy management.

Various embodiments are proposed which allow for returning the honeycomb celled material from the deployed state to the dormant state in the event a serious crash does not occur. While various automatic means can be envisioned, one embodiment would involve a manual reset, for example by a trained mechanic at a dealership. For example, the mechanic would compress the honeycomb celled material back to the dormant state, compress an expansion agency (i.e., a spring) and reset a catch of the deployment means holding the honeycomb celled material in the dormant state ready for expansion in the event of a forthcoming crash.

Accordingly, it is one embodiment herein to provide a dedicated crash energy management structure, comprising a volume-filling structure with deployment means for deploying the volume-filling structure from a small dormant state volume which in the event of a crash, timely expands into a much larger deployed volume for providing management of an expectant crash pulse.

This and additional features and advantages will become clearer from the following specification.

DESCRIPTION OF THE PREFERRED EMBODIMENT

Figure 1:
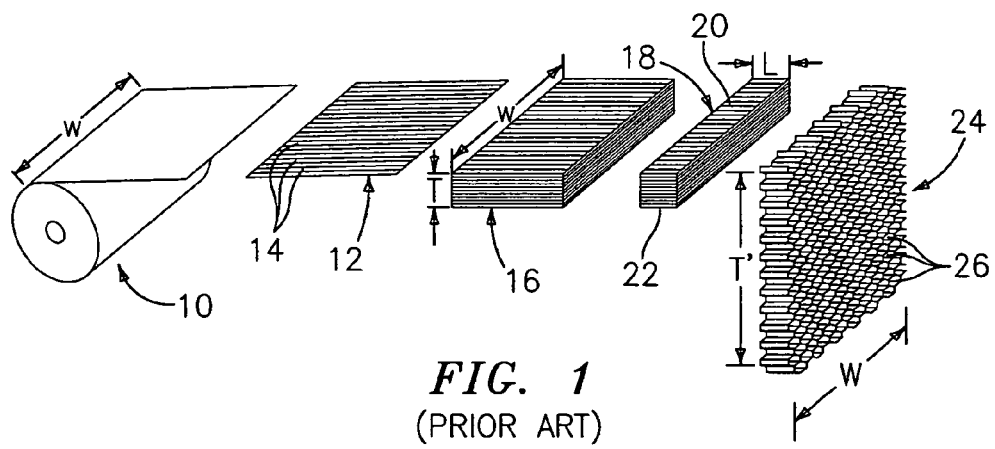
FIG. 1 is a series of perspective views of a manufacturing process to provide a prior art honeycomb celled material.

The present disclosure provides a crash energy management structure that comprises an expandable volume-filling mechanical structure for containing and cushioning occupants within the vehicle in impacts with both interior and exterior objects, wherein the volume-filling mechanical structure has means for, in the event of a crash, timely expanding into a deployed volume for providing energy absorption of an expectant crash. At around the time of a crash event in or around a vehicle and/or about energy impact is when the means for deploying the volume-filling structure may be actuated. The current disclosure employs the volume-filling mechanical structures such as honeycomb celled material 104 with a knee bolster for a driver or passenger within the vehicle. Such employment allows variation of current knee bolster design guidelines while providing for easy deployment of honeycomb celled material 104 from a dormant state to a deployed state without significant expense or complexity.

Referring now to the Drawings, FIGS. 2 through 16 depict preferred embodiments of an active dedicated crash energy management structure 100 according to the present invention.

Figure 2:
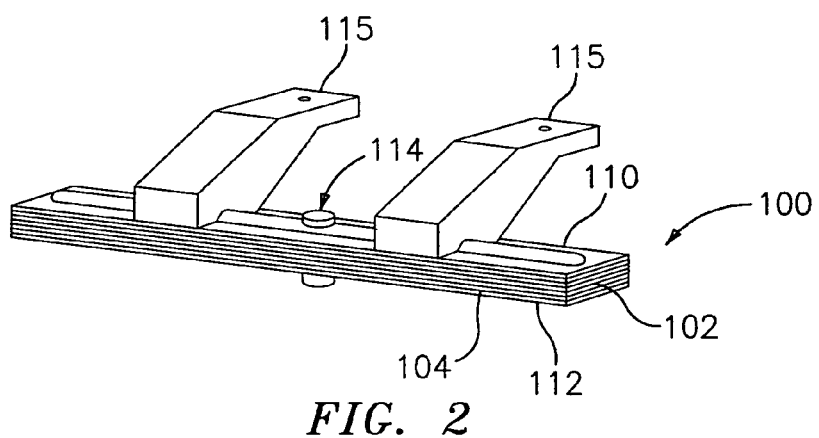
FIG. 2 is a perspective view of a crash energy management device according to the present invention, shown in a before expanded (dormant) state.
Figure 3:
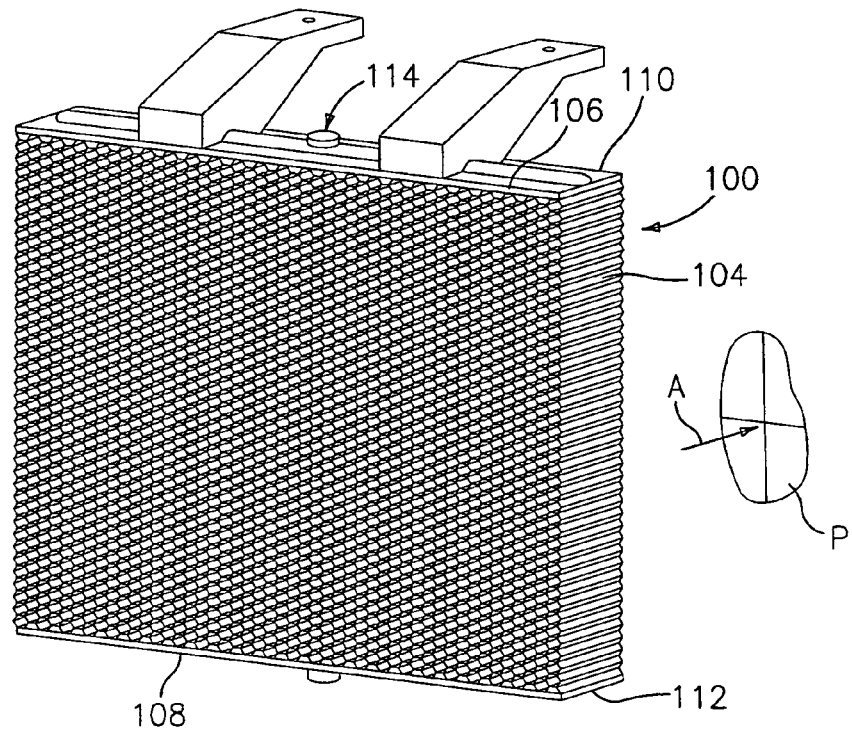
FIG. 3 is a perspective view of the crash energy management device of FIG. 2, shown in an expanded (deployed) state.

A honeycomb brick 102 composed of a honeycomb celled material 104 is provided, as for example according to a method of manufacture utilized to provide HOBE® bricks, as discussed hereinabove. The honeycomb brick 102 is not expanded such that it is at its most compacted state. Attached (such as for example by an adhesive) to the upper and lower faces 106, 108 of the honeycomb brick 102 are respective end caps 110, 112. The end caps 110, 112 are rigid and serve as guide members for defining the configuration of the honeycombed cell material 104 between a dormant state as shown at FIG. 2 and a deployed state as shown at FIG. 3.

The end caps 110, 112 need not necessarily be planar. Indeed, they do not need to have the same shape or size, but for a minimum unexpanded volume the end caps should have the same size and shape. For example, if deployed at a knee bolster area, the end caps may have a slightly curved shape generally matching the curve of the knee bolster area corresponding with a lower portion of the instrument panel extending along a width defining the vehicle. For another example, for expansion into a narrowing wedge shaped space, the end cap which moves as the honeycomb celled material expands may be shorter than the stationary end cap, so that the expanded honeycomb celled material has a complimentary wedge shape.

An activation mechanism 114 is connected to the end caps 110, 112. The activation mechanism 114 controls the state of the honeycomb-celled material in that when activated, a rapid expansion from the dormant state to the deployed state occurs. One or more installation brackets 115 may be connected to one of the end caps 110, 112 so that the crash management structure 100 is connectable to a selected component of a motor vehicle. Alternatively, one of the end caps 110, 112 may be fixedly secured directly to a selected component of the motor vehicle without any installation brackets, as discussed more fully herein.

Figure 4:
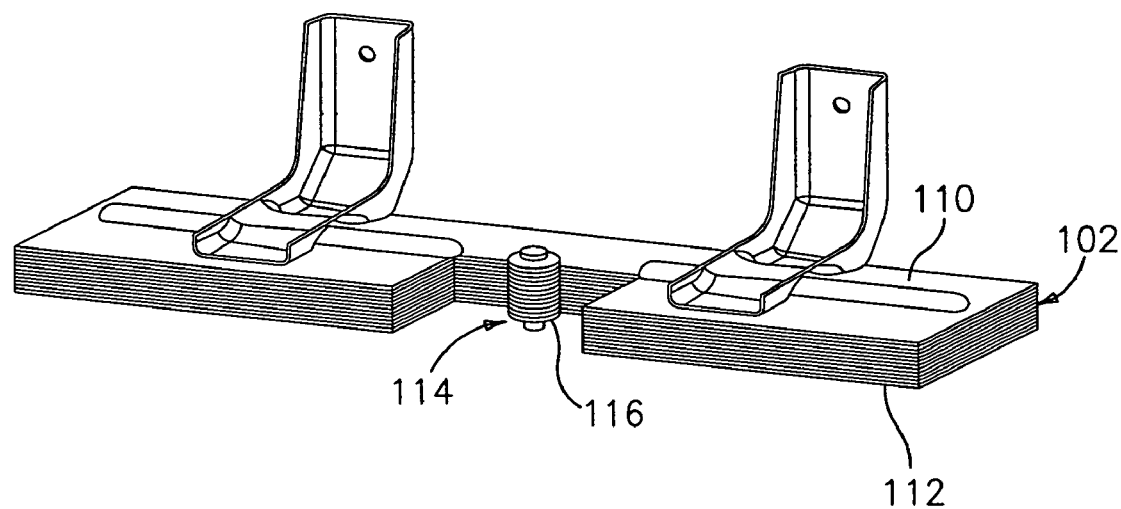
FIG. 4 is a perspective, cut-away view of a crash energy management device according to the present invention, showing an example of an active activation system.
Figure 5:
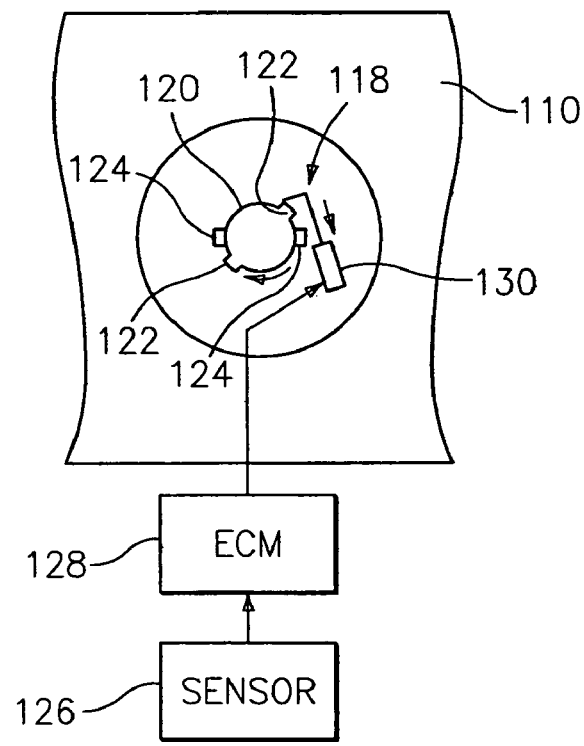
FIG. 5 is a broken-away, top plan view, showing a trigger of the activation system of FIG. 4.

An example of an activation mechanism 114 is shown at FIGS. 4 and 5. An expansion agency in the form of a highly compressed spring 116 is situated abuttingly between the end caps 110, 112. The spring 116 is held highly compressed selectively by a trigger 118. The trigger 118 includes a disk 120 which is rotatably mounted to an end cap 110, wherein the disk has a pair of opposed fingers 122 which are receivable by a pair of opposed slots 124 formed in the end cap. In an active form, the activation mechanism 114 is triggered by a signal from a crash sensor 126 which signal is interpreted by an electronic control module 128, which in response sends an activation signal to a solenoid 130. The activation signal causes a rotation of the disk 120 so as to cause the fingers 122 to fall into the slots 124 and thereupon the spring to rapidly decompress resulting in the honeycombed cell material to rapidly expand from the dormant state of FIG. 2 to the deployed state of FIG. 3. Other expansion agencies besides a compressed spring may include a pyrotechnic device or a pressurized air cylinder. Alternatively, the activation mechanism may be passive and mechanically triggered by a crash due to crash induced movement of vehicle components.

Figure 6:
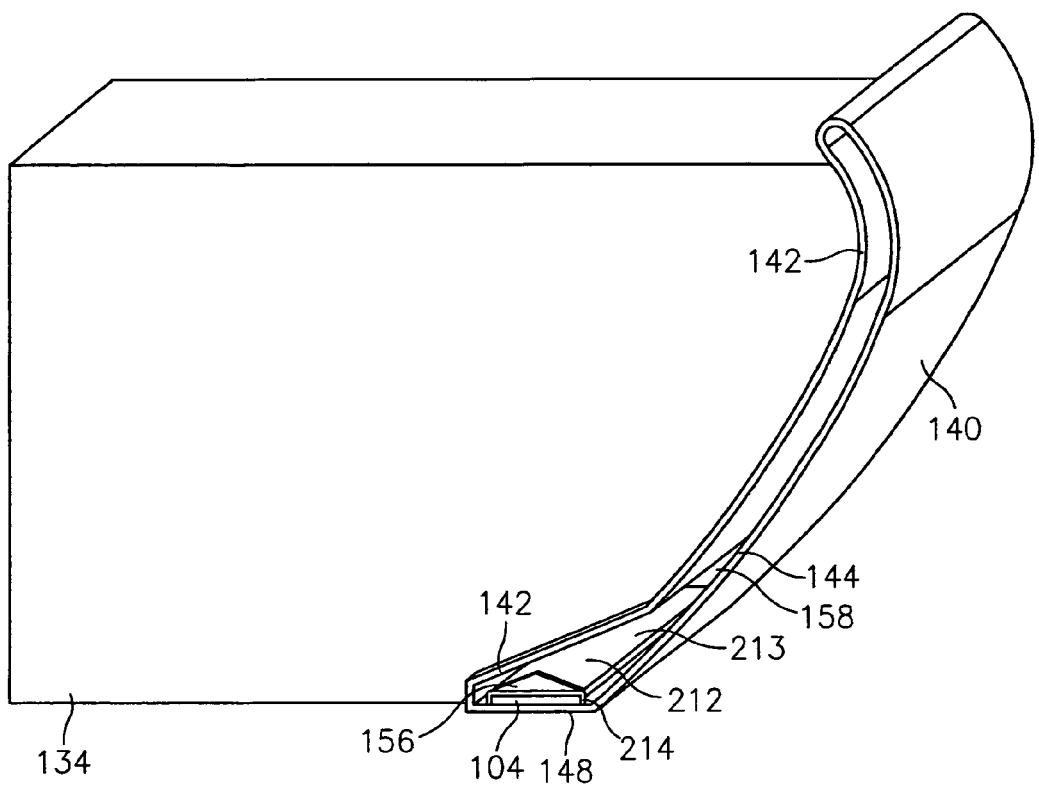
FIG. 6 is a cross section perspective side view of a glove compartment panel of a motor vehicle showing examples of placement of crash energy management devices according to the present invention.

FIGS. 6 though 16 show illustrative examples of knee bolster compartment placements of the active dedicated crash energy management structure 100. Placements may also, for example, be located at a glove box door 140 for a passenger (FIGS. 6-15) or located between the instrument panel retainer 342 and the steering column filler 344 for a driver (FIG. 16).

Figure 7:
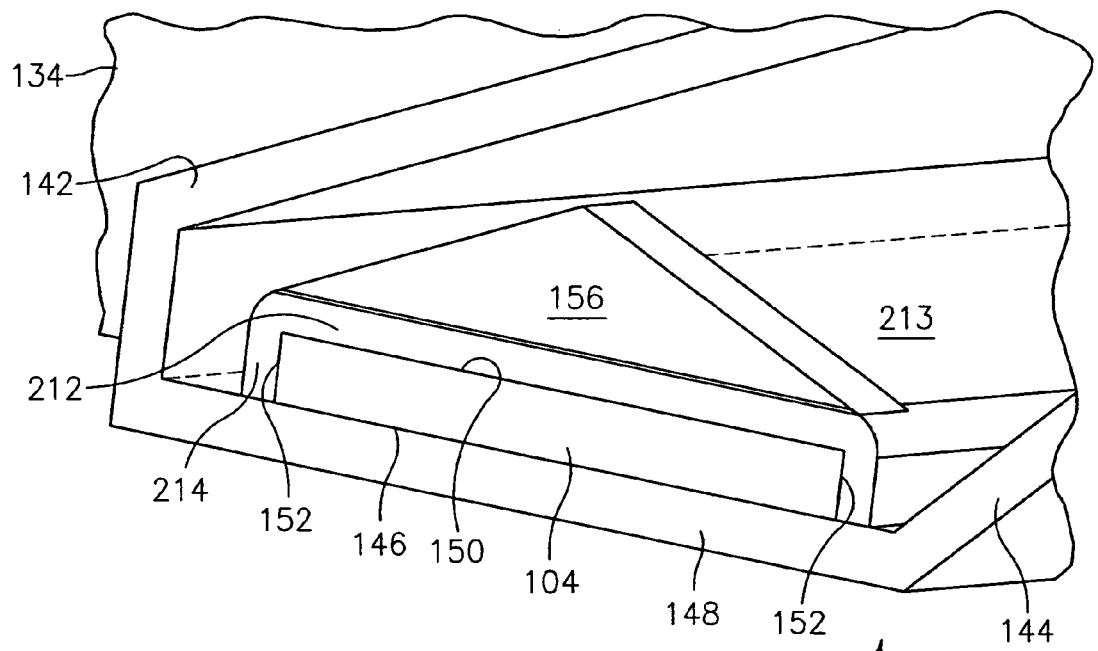
FIG. 7 is an enlarged partial view of the glove compartment panel of FIG. 6, showing the crash energy management devices in the dormant state.

Referring now to FIGS. 6 and 7, a glove box 134 having a glove box door 140 is illustrated. Glove box door 134 includes an inner bolster 142 and an outer bolster 144 with honeycomb celled material 104 disposed therebetween. A first surface 146 defining a bottom surface of honeycomb celled 104, as illustrated, is fixedly secured to a bottom portion 148 defining glove box door 134. Ends defining bottom portion 148 are respectively connected to ends defining inner and outer bolsters 142 and 144, respectively.

A second surface 150 opposite first surface 146 defining a top surface of honeycomb celled material 104, as illustrated, is fixedly secured to an end cap 210. End cap 212 is similar to end cap 112 as described in FIGS. 1-5. In one embodiment as illustrated, end cap 212 may include flanges 214 extending from either of opposite edges defining a portion 213 of end cap 212 covering second surface 150 along a length thereof. Flanges 214 cover opposite side portions 152 of honeycomb celled material 104 in a dormant state. End cap 212 is receptive to a tether (not shown), for example, to aid in deployment or extend honeycomb celled material into a deployed state. In an exemplary embodiment, end cap 212 is a plastic upper carrier to aid in deployment of material 104.

Portion 213 of end cap 212 further includes a wedge 156 extending from opposing ends of portion 213. Each wedge 156 is defined by a pointed portion extending in a void 158 defined between inner and outer bolsters 142, 144, respectively, where honeycomb celled material 104 is absent and in the dormant state (best seen in FIG. 7). Although wedge 156 is described to be disposed at opposing ends of cap 212, it is contemplated that wedge 156 may extend an entire length thereof or along any portion defining a length of portion 213 of cap 212. In this manner, wedge 156 facilitates expansion of outer bolster 144 from inner bolster 142 when honeycomb celled material 104 is activated to be deployed and extend to fill void 158 between inner and outer bolsters 142 and 144. Wedge 156 thus guides and facilitates expansion of expansion of honeycomb celled material 104

Figure 8:
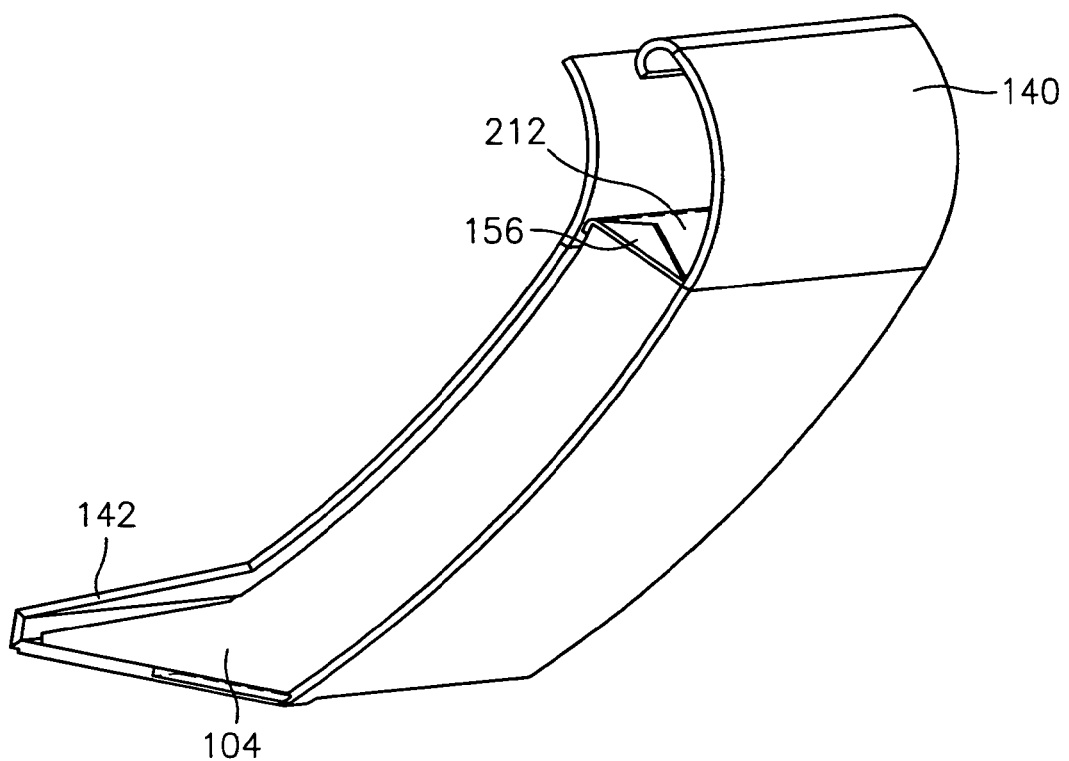
FIG. 8 is a cross section perspective side view of a glove compartment panel of FIG. 6, showing the crash energy management devices in the deployed state.

As can be seen by comparison between FIG. 6 (showing the dormant state) and FIG. 8 (showing the deployed state), upon triggering of the activation mechanism, the expansion of the honeycomb celled material 104 is in a transverse plane P which is perpendicular to an anticipated crash axis A (see FIG. 3), without expansion or contraction in the crash axis dimension. The expansion of the honeycomb-celled material 104 is into transversely unoccupied space or void 158.

Still referring to FIGS. 6-8, when the vehicle sensors detect a frontal collision, honeycomb celled material 104 expands forcing the outer bolster 144 of glove box door 140 away from inner bolster 142 and toward a rear of the vehicle. The glove box door inner and outer bolsters 142, 144 are operably coupled to retain outer bolster 144 relative to inner bolster 142. In an exemplary embodiment, inner and outer bolsters 142, 144 are snapped together and tethered to each other to retain the outer bolster in the deployed state. However, other various retention means are contemplated, including those identified in FIG. 16, but not limited thereto.

This deployment can be accomplished using various means. In an exemplary embodiment, honeycomb celled material 104 is aluminum, which expands to 60 times its original thickness and can be deployed with $\frac{1}{10}$ the energy the material manages when deployed. In addition, the energy management properties of honeycomb celled material 104 can be tuned by varying the honeycomb celled material wall thickness, honeycomb density and the overall thickness.

Referring now to FIGS. 9-12, another exemplary embodiment of a volume-filling mechanical structure for modifying a crash is illustrated. More specifically, it is pointed out that on all vehicles sold in North America by the assignee of the present application, the glove box door and steering column filler location and shape is developed using well known knee bolster design guidelines. The glove box door and steering column filler surface resulting from the use of the guidelines is almost flat. This shape is developed to provide a consistent surface that is parallel to the knees of an occupant seated in the vehicle yielding a repeatable loading surface to manage the energy of unbelted occupants. However, this flat surface greatly limits the creativity of the studio stylists and reduces product differentiation by forcing this area on all vehicles to look virtually identical.

Figure 9:
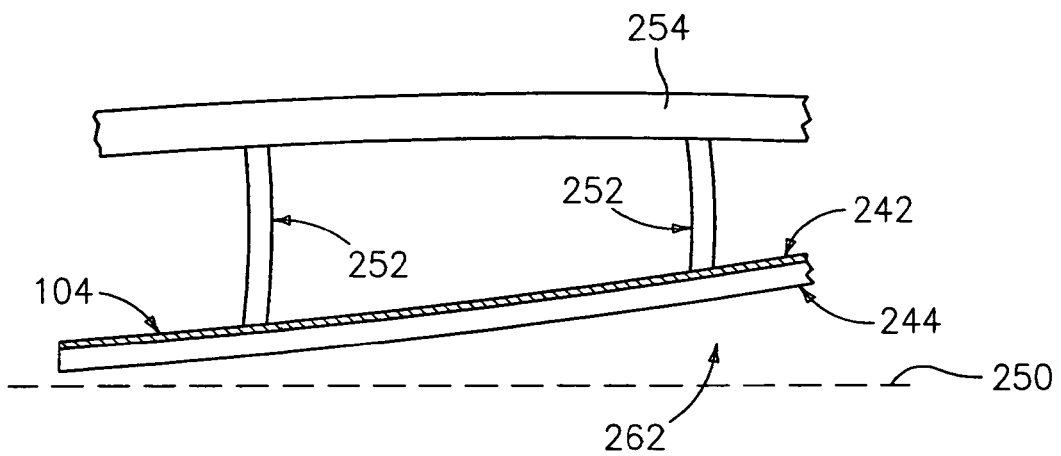
FIG. 9 is a top cross section view of the volume-filling mechanical structure of FIG. 2, shown in conjunction with an outer bolster removed from a bolster zone in a dormant state.

FIG. 9 illustrates an outer bolster 244 of a glove box door panel, instrument panel, or steering column panel having at least a portion of an exposed rearward surface 246 of outer bolster 244 removed from a bolster zone indicated with line 250. Outer bolster 244 is shown operably coupled with an inner bolster 242 having honeycomb celled material disposed therebetween indicated at 104 in FIG. 6. Inner bolster 242 is supported by a pair of brackets 252. Brackets 252 in turn are operably coupled to a cross structural beam 254 extending a width of the vehicle.

Figures 10, 11:
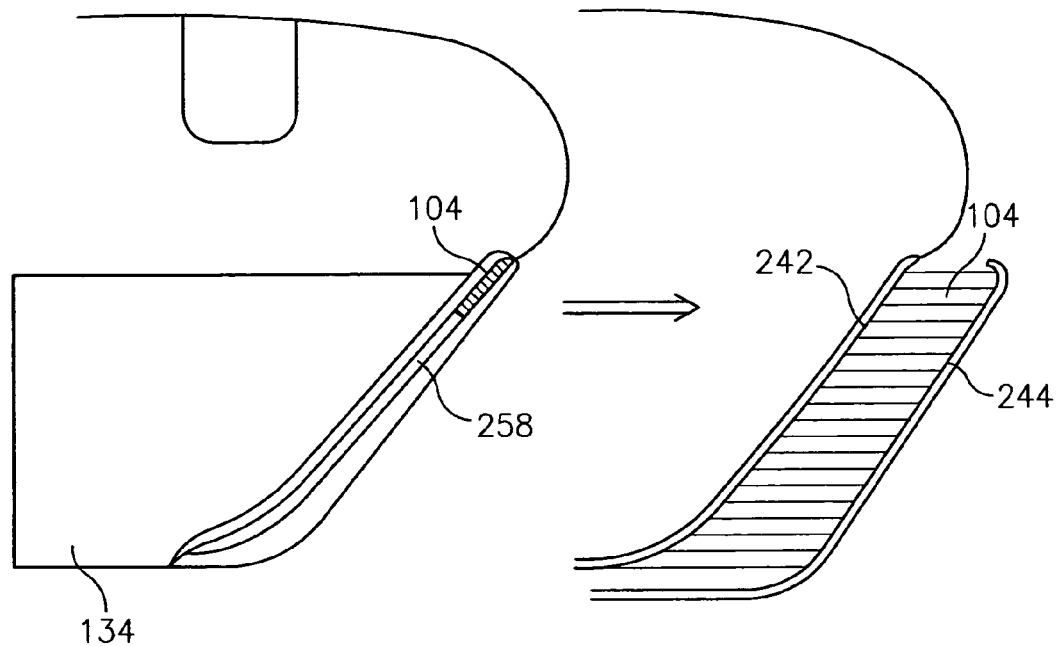
FIG. 10 is a cross section side view of FIG. 9.
FIG. 11 is a cross section side view of FIG. 10 illustrating the volume-filling mechanical structure in a deployed state.

FIG. 10 illustrates a side view of glove box 134 having outer and inner bolsters 242, 244, as a glove box door panel with the honeycomb celled material 104 in a dormant state. As can be seen by comparison between FIG. 10 (showing the dormant state) and FIG. 11 (showing the deployed state), upon triggering of the activation mechanism, the expansion of the honeycomb celled material 104 is in a transverse plane P which is perpendicular to an anticipated crash axis A (see FIG. 3), without expansion or contraction in the crash axis dimension. The expansion of the honeycomb-celled material 104 is into a transversely unoccupied space or void 258.

Now referring to FIGS. 9-12, when the vehicle sensors detect a frontal collision, honeycomb celled material 104 expands forcing the outer bolster 244 of glove box door 240 away from inner bolster 242 and toward a rear of the vehicle. The glove box door inner and outer bolsters 242, 244 are operably coupled to retain outer bolster 144 relative to inner bolster 142. In an exemplary embodiment, inner and outer bolsters 242, 244 are snapped together and tethered to each other to retain the outer bolster in the deployed state.

Figure 12:
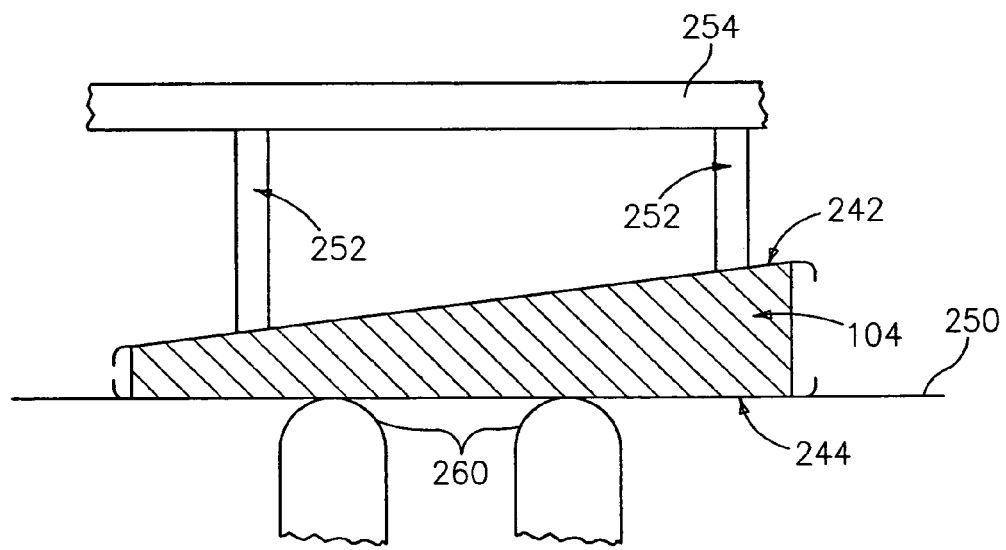
FIG. 12 is a top cross section view as in FIG. 9 of the volume-filling mechanical structure in a deployed state of FIG. 11 illustrating the outer bolster extending to the bolster zone and a pair of knees of an occupant.

The exemplary embodiment depicted in FIGS. 9-12 decouples the bolster zone 250 from the glove box door or steering column filler surface allowing the stylist to implement curved and sweeping surfaces, as best seen in FIG. 9, to achieve greater product differentiation while providing a parallel loading surface (e.g., against knees 260) to meet occupant protection needs, as best seen in FIG. 12.

In an exemplary embodiment, the decoupling is achieved using a varied cross section aluminum honeycomb unbelted occupant energy management system. The honeycomb celled material 104 is installed inside a glove box door or steering column filler panel in an unexpanded state. When the vehicle sensors detect a frontal collision, the honeycomb celled material expands forcing the outer bolster 244 outward and rearward. Aluminum honeycomb material expands to 60 times its original thickness and can be deployed with $\frac{1}{10}$ the energy the material manages when deployed.

As illustrated in FIGS. 9-12, the honeycomb celled material 104 is disposed at an upper portion of the glove box door panel via bonding, for example, as well as a plastic carrier (not shown) to aid in deployment. However, it will be recognized that honeycomb celled material 104 may be disposed at a bottom portion or any other portion of the glove box door panel. As described with reference to FIGS. 6-8, the glove box door inner and outer bolsters, 242, 244, respectively, are operably coupled to retain outer bolster 244 relative to inner bolster 242. In an exemplary embodiment, inner and outer bolsters 242, 244 are snapped together (dormant state) and tethered to each other to retain the outer bolster while in the deployed state.

Accordingly, FIGS. 9-12 depict an energy management system that can compensate for angled glove box door and steering column filler designs that offers more styling flexibility. In particular, FIG. 9 illustrates an increase in space obtained generally indicated at 262 intermediate bolster zone 250 and an exposed surface defining outer bolster 244. In addition, the energy management properties of the honeycomb celled material can be tuned by varying the honeycomb wall thickness, honeycomb density and the overall thickness as illustrated with reference to FIGS. 13-15.

Figure 13:
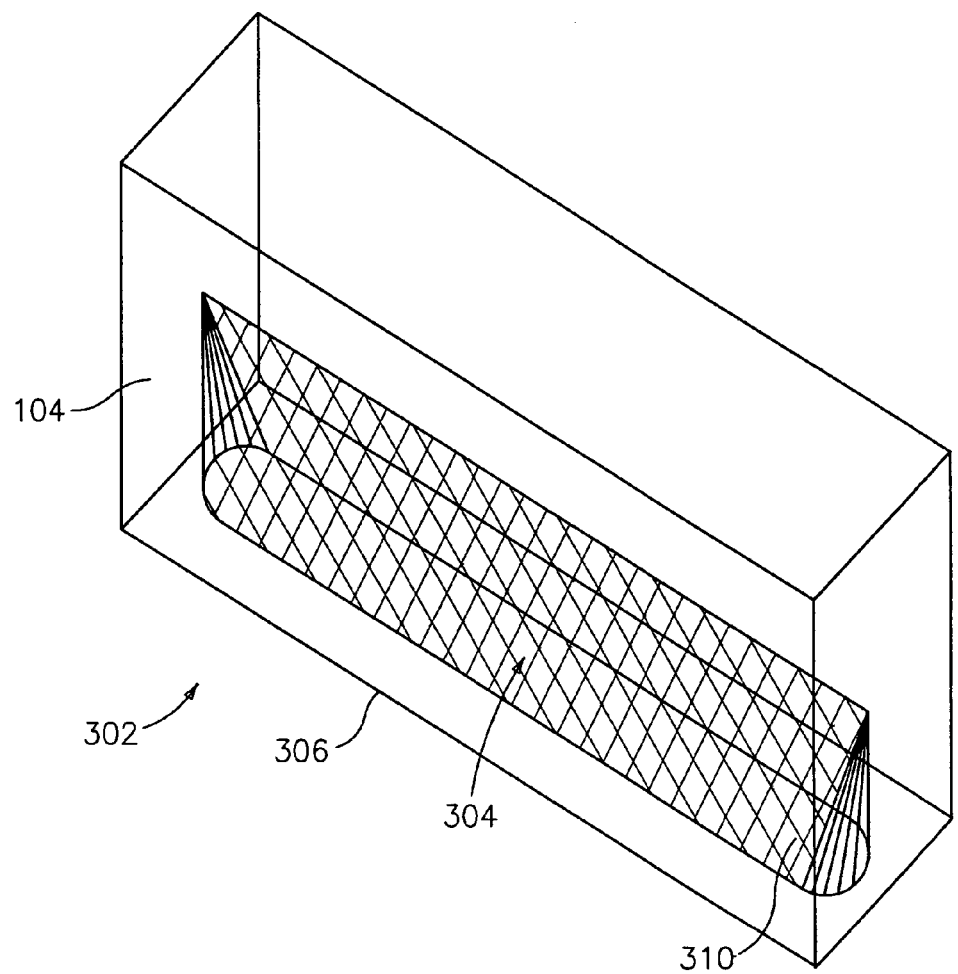
FIG. 13 is a perspective view of the honeycomb celled material of FIG. 1 in an expanded form as a honeycomb brick illustrating a portion of material removed from a bottom portion thereof.
Figure 14:
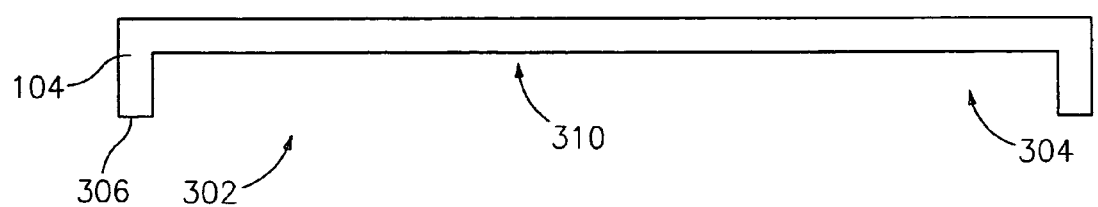
FIG. 14 is a cross section front view of FIG. 13 in an unexpanded form.
Figure 15:
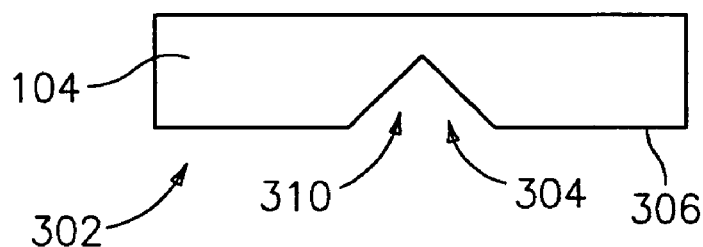
FIG. 15 is a side view of FIG. 14.
Figure 16:
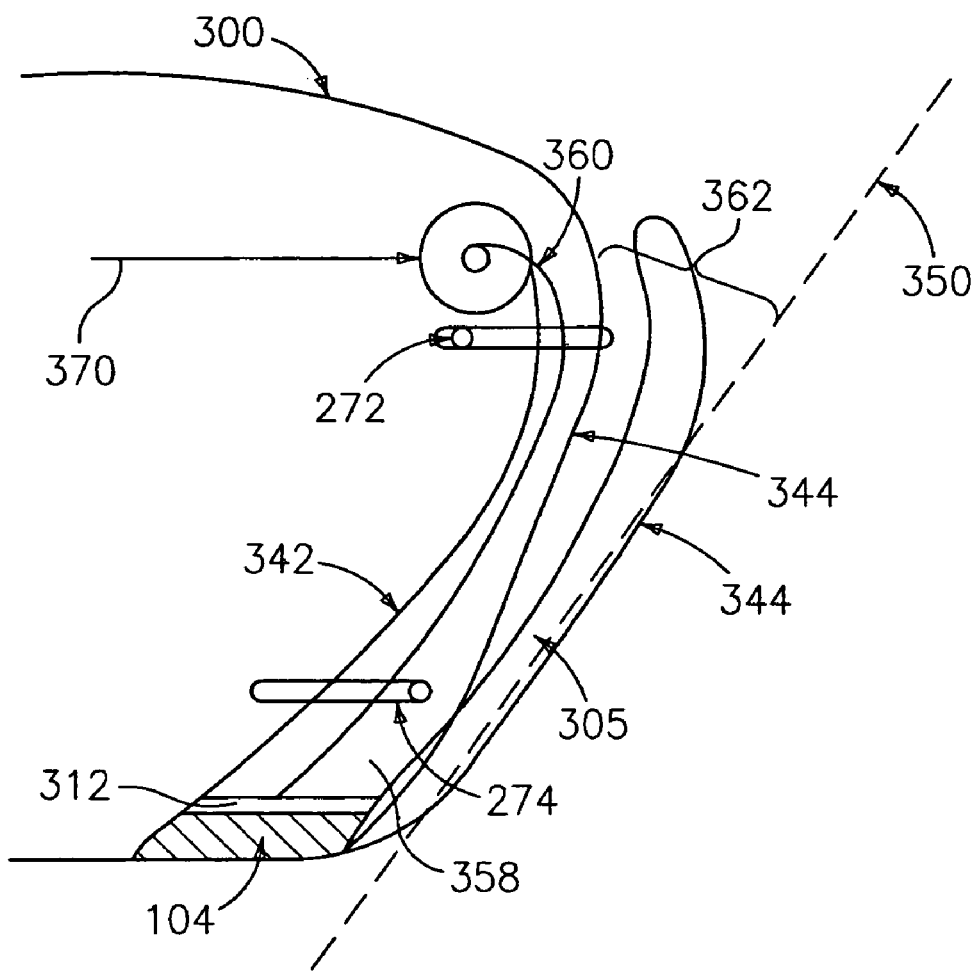
FIG. 16 is a cross section side view of an instrument panel illustrating a steering column filler expanded to a bolster zone via deployment of the honeycomb celled material of FIG. 1 in accordance with an alternative exemplary embodiment.

FIGS. 13-15 depict various views of a tuning method of a honeycomb brick 302 including a portion of honeycomb celled material 104 removed from a bottom portion 306 thereof. Tuning is achieved by removing a portion of material 104 generally indicated at 304 to locally reduce the energy management properties of the honeycomb celled material 104. In the embodiment illustrated in FIGS. 13-15, the portion removed is triangular, however, any geometric shape is contemplated to be removed from brick 302. This local material removal is achieved through drilling or milling using a precision material removal tool or process, for example. The material removal is completed while the honeycomb celled material is in an unexpanded form or dormant state.

For example, material removal as indicated in FIGS. 13-15 is advantageous in a passengers side bolster system. A lower portion of the bolster system is weakened to reduce the knee loads for smaller occupants, while providing the needed load carrying capabilities for larger occupants at an upper portion of the bolster system. Tape or a similar material may need to be placed over a cavity 310 defined by the removed material 304 hole prior to bonding the unexpanded honeycomb celled material 104 to receiving surface (not shown) corresponding with a surface defining bottom portion 306. The tape or other covering of cavity 310 prevents a bonding agent (not shown) from entering cavity 310. As discussed above, honeycomb celled material 104 is of any metallic composition, including aluminum, for example. In the above manner, removal of a portion of honeycomb material 104 from an unexpanded brick 302 enables easier tuning to accommodate a larger range of occupant sizes and proves to be an effective initial design direction. In contrast, knee bags are costly and heavy such that use of knee bags are utilized only when necessary, not as an initial design choice or direction.

FIG. 16 is a cross section side view of an instrument panel 300 illustrating a steering column filler panel expanded to a bolster zone 350 via deployment of the honeycomb celled material 104 of FIG. 1 in accordance with an alternative exemplary embodiment. More specifically, instrument panel 300 proximate a steering column (not shown) includes a steering column filler panel 305 that is decoupled from the bolster zone 350 allowing the stylist to implement curved and sweeping surfaces, as best seen in FIG. 9 with respect to the embodiment of a glove box door panel in a dormant state, to achieve greater product differentiation while providing a parallel loading surface (e.g., against knees 260) to meet occupant protection needs, as best seen with reference to FIG. 12.

In an exemplary embodiment, the decoupling is achieved using a varied cross section aluminum honeycomb unbelted occupant energy management system. The honeycomb celled material 104 is installed in a void 358 created by a space intermediate an inner bolster 342 and an outer bolster 344 in an unexpanded state, as illustrated. It will be recognized that outer bolster 344 corresponds to steering column filler panel 305.

As illustrated in FIG. 16, the honeycomb celled material 104 is disposed at a lower portion of the void 358 and a first surface thereof is coupled to a bottom surface of instrument panel 300 via bonding, for example. A second opposite surface of the honeycomb celled material includes a plastic carrier or end plate coupled thereto, such as a plastic carrier 312 to aid in deployment via a tether 360. Tether 360 is operably connected to a deployment mechanism 370 at an opposite end. However, it will be recognized that honeycomb celled material 104 may be disposed at an upper portion or any other portion of defined by void 358 and is not limited to being disposed at a bottom portion thereof. As described with reference to FIGS. 6-8, the steering column filler panel inner and outer bolsters, 342, 344, respectively, are operably coupled to retain outer bolster 244 relative to inner bolster 242. In an exemplary embodiment as illustrated, for example, outer bolster 244 includes a pin 272 extending therefrom and is retained within a slot 274 to aid in the deployment, alignment and retention of outer bolster 344 relative to inner bolster 342.

Accordingly, FIG. 16 depicts an energy management system that can compensate for steering column filler designs that offers more styling flexibility. In particular, FIG. 16 illustrates an increase in space obtained generally indicated at 362 intermediate bolster zone 350 and an exposed surface defining outer bolster 344. The energy management properties can also be tuned, as discussed with reference to FIGS. 13-15, by varying the honeycomb wall thickness, honeycomb density and the overall thickness.

In an exemplary embodiment, expandable aluminum honeycomb celled material 104 is used to provide energy management for protection of unbelted occupants. The honeycomb material is installed between the instrument panel retainer or inner bolster 344 and the steering column filler or outer bolster 344, in an unexpanded state. When the vehicle sensors detect a frontal collision, a sensor generates a signal to deployment mechanism 370 to actuate and expand honeycomb celled material 104 via tether 360 pulling on plastic retainer 312. The honeycomb celled material then expands forcing the steering column filler rearward toward bolster zone 350. This deployment can be accomplished using various means as understood and appreciated by those skilled in the pertinent art.

The aluminum honeycomb material expands to 60 times its original thickness and can be deployed with $\frac{1}{10}$ the energy the material manages when deployed. The use of the metallic honeycomb celled material, such as aluminum, for example, can improve protection of occupants, as well as improve spaciousness or a balance of both.

The above described exemplary embodiments provide an energy management deployment system that can be easily carried from one vehicle design to another with minimal work and allows easy tuning for specific vehicle parameters and accommodation of a larger range of occupant sizes. Furthermore, the energy management deployment system increases crash performance, while enabling a more spacious interior and more styling flexibility. For example, the energy management deployment system compensates for angled glove box door and steering column filler designs, while providing a parallel loading surface when needed.

To those skilled in the art to which this invention appertains, the above-described preferred embodiment may be subject to change or modification. Such change or modification can be carried out without departing from the scope of the invention, which is intended to be limited only by the scope of the appended claims.

The invention claimed is:

1. A volume-filling mechanical structure for modifying a crash comprising:

a bolster system defined by an outer bolster and an inner bolster;

a honeycomb celled material expandable from a dormant state to a deployed state, the honeycomb celled material disposed intermediate the outer and inner bolsters cooperatively positioned with the honeycomb celled material to cover surfaces defining the honeycomb celled material in the deployed and dormant states;

a means for deploying said honeycomb celled material from said dormant state to said deployed state causing the outer bolster to translate away from the inner bolster;

a first rigid end cap connected to a first end of the honeycomb celled material and a second rigid end cap connected to a second end of the honeycomb celled material; and wherein the first rigid end cap includes a wedge or is wedge-shaped to facilitate translation of the outer bolster away from the inner bolster upon deployment of the honeycomb celled material.

2. The volume-filling mechanical structure of claim 1, wherein the outer bolster includes an exposed surface of the instrument panel.

3. The volume-filling mechanical structure of claim 2, wherein the exposed surface of the instrument panel includes one of a glove box door and a steering column filler.

4. The volume-filling mechanical structure of claim 3, wherein the honeycomb celled material expandable to a deployed state translates the glove box door or steering column filler toward a rear of the vehicle.

5. The volume-filling mechanical structure of claim 1, wherein the honeycomb celled material comprises a metallic composition.

6. The volume-filling mechanical structure of claim 1, wherein the first rigid cap is receptive to aid deployment by the means for deploying said honeycomb celled material, while the second rigid cap is bonded to one of a lower or upper portion defining the bolster system.

7. A volume-filling mechanical structure for modifying a crash comprising:
    a bolster system defined by an outer bolster and an inner bolster;
    a honeycomb celled material expandable from a dormant state to a deployed state, the honeycomb celled material disposed intermediate the outer and inner bolsters cooperatively positioned with the honeycomb celled material to cover surfaces defining the honeycomb celled material in the deployed and dormant states;
    a means for deploying said honeycomb celled material from said dormant state to said deployed state causing the outer bolster to translate away from the inner bolster;
    wherein the honeycomb celled material includes a variable thickness receptive to allow non-parallel expansion along at least one of a width and length of the outer bolster.

8. The volume-filling mechanical structure of claim 7, wherein said dormant state of the honeycomb celled material displaces the outer bolster away from a bolster zone while providing a substantially parallel loading surface in said deployed state.

9. A volume-filling mechanical structure for modifying a crash comprising:
    a bolster system defined by an outer bolster and an inner bolster;
    a honeycomb celled material expandable from a dormant state to a deployed state, the honeycomb celled material disposed intermediate the outer and inner bolsters cooperatively positioned with the honeycomb celled material to cover surfaces defining the honeycomb celled material in the deployed and dormant states;
    a means for deploying said honeycomb celled material from said dormant state to said deployed state causing the outer bolster to translate away from the inner bolster;
    wherein the honeycomb celled material includes energy management properties that can be tuned by varying a thickness of the honeycomb celled material.

10. The volume-filling mechanical structure of claim 9, wherein the tuning is achieved by selectively removing material from the honeycomb celled material.

11. The volume-filling mechanical structure of claim 9, wherein a portion of a lower portion defining the honeycomb celled material is removed to reduce knee loads.

12. A volume-filling mechanical structure for modifying a crash comprising:
    a bolster system defined by an outer bolster and an inner bolster;
    a honeycomb celled material expandable from a dormant state to a deployed state, the honeycomb celled material disposed intermediate the outer and inner bolsters cooperatively positioned with the honeycomb celled material to cover surfaces defining the honeycomb celled material in the deployed and dormant states;
    a means for deploying said honeycomb celled material from said dormant state to said deployed state causing the outer bolster to translate away from the inner bolster;
    wherein translation of the outer bolster away from the inner bolster beyond a thickness of the honeycomb celled material is limited by a restraining device; and
    wherein the restraining device includes a fixed slot and pin arrangement, the outer bolster having a pin in a slot retraining translation thereof.

13. The volume-filling mechanical structure of claim 12, wherein the pin and slot arrangement is disposed on at least opposing sides defining the outer bolster facilitating at least one of alignment and retention of a translating outer bolster.

* * * * *